United States Patent
Zhu et al.

(10) Patent No.: US 10,962,413 B2
(45) Date of Patent: Mar. 30, 2021

(54) FREEFORM SURFACE IMAGING SPECTROMETER SYSTEM

(71) Applicants: Tsinghua University, Beijing (CN); HON HAI PRECISION INDUSTRY CO., LTD., New Taipei (TW)

(72) Inventors: Jun Zhu, Beijing (CN); Ben-qi Zhang, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 156 days.

(21) Appl. No.: 16/246,790

(22) Filed: Jan. 14, 2019

(65) Prior Publication Data
US 2019/0250033 A1    Aug. 15, 2019

(30) Foreign Application Priority Data
Feb. 9, 2018 (CN) .......................... 201810139896.X

(51) Int. Cl.
*G01J 3/02*    (2006.01)
*G01J 3/28*    (2006.01)

(52) U.S. Cl.
CPC ............. *G01J 3/024* (2013.01); *G01J 3/2823* (2013.01)

(58) Field of Classification Search
CPC ... G01J 3/024; G01J 3/2823; G01J 2003/2826
See application file for complete search history.

(56) References Cited

U.S. PATENT DOCUMENTS

| 2004/0184033 A1* | 9/2004 | Nelson | G01J 3/2823 356/302 |
| 2015/0253552 A1* | 9/2015 | Zhu | G02B 17/0626 250/216 |
| 2018/0136039 A1* | 5/2018 | Rolland | G01J 3/0208 |

FOREIGN PATENT DOCUMENTS

CN        106289524        1/2017

OTHER PUBLICATIONS

Lidong Wei, "Optical design of Offner-Chrisp imaging spectrometer with freeform surfaces", 2016, SPIE (Year: 2016).*
J Reimers et al., Freeform Spectrometer Enabling Increased Compatness,, Light: Science & Apllications,Jul. 28, 2017.

* cited by examiner

*Primary Examiner* — Maurice C Smith
(74) *Attorney, Agent, or Firm* — ScienBiziP, P.C.

(57) ABSTRACT

A freeform surface imaging spectrometer system including a primary mirror, a secondary mirror, a tertiary mirror, and a detector is provided. The secondary mirror is a grating having a freeform surface shape, and the grating having the freeform surface shape is obtained by intersecting a set of equally spaced parallel planes with a freeform surface. A plurality of feature rays exiting from a light source is successively reflected by the primary mirror, the secondary mirror and the tertiary mirror to form an image on an image sensor. A reflective surface of each of the primary mirror, the tertiary mirror surface and the tertiary mirror is an xy polynomial freeform surface.

16 Claims, 3 Drawing Sheets

US 10,962,413 B2

FREEFORM SURFACE IMAGING SPECTROMETER SYSTEM

CROSS-REFERENCE TO RELATED APPLICATIONS

This application claims all benefits accruing under 35 U.S.C. § 119 from China Patent Application No. 201810139896.X, field on Feb. 9, 2017 in the China National Intellectual Property Administration, disclosure of which is incorporated herein by reference. The application is also related to copending applications entitled, "METHOD OF DESIGNING FREEFORM SURFACE OPTICAL SYSTEMS WITH DISPERSION ELEMENTS", U.S. Ser. No. 16/246,739 filed _____.

FIELD

The present disclosure relates to a freeform surface imaging spectrometer system.

BACKGROUND

Imaging spectrometers with dispersion elements are applied in a wide variety of fields, including biomedical measurements, earth remote sensing and space exploration. An optical system with dispersive elements is a key instrument of the imaging spectrometers with dispersion elements. The optical system with dispersive elements has wider fields of view, higher spectral bandwidths and higher spatial/spectral resolutions than the optical system without dispersive elements. Promoting a development of the optical system with dispersive elements has long been pursued by optical designers.

A freeform surface is a surface that cannot be represented by a spherical or aspherical surface. The freeform surface is a complex surface without symmetry. Freeform surface optics is regarded as a revolution in optical design. Freeform surface optics involves optical system designs that contain at least one freeform surface with no translational or rotational symmetry. As a benefit of the high numbers of degrees of freedom surfaces, novel and high-performance optical systems can be obtained.

However, the freeform surfaces are rarely used in conventional imaging spectrometer system, because of their multi variables and high degrees. And, when the freeform surfaces are used in the imaging spectrometer system, a volume, a weight and amount of lenses should be considered. As such, it is difficult to design an imaging spectrometer system with simple structure and superior imaging effect.

Thus there is a room for improvement.

BRIEF DESCRIPTION OF THE DRAWINGS

Implementations of the present technology will now be described, by way of example only, with reference to the attached figures.

DETAILED DESCRIPTION

Figure 1:
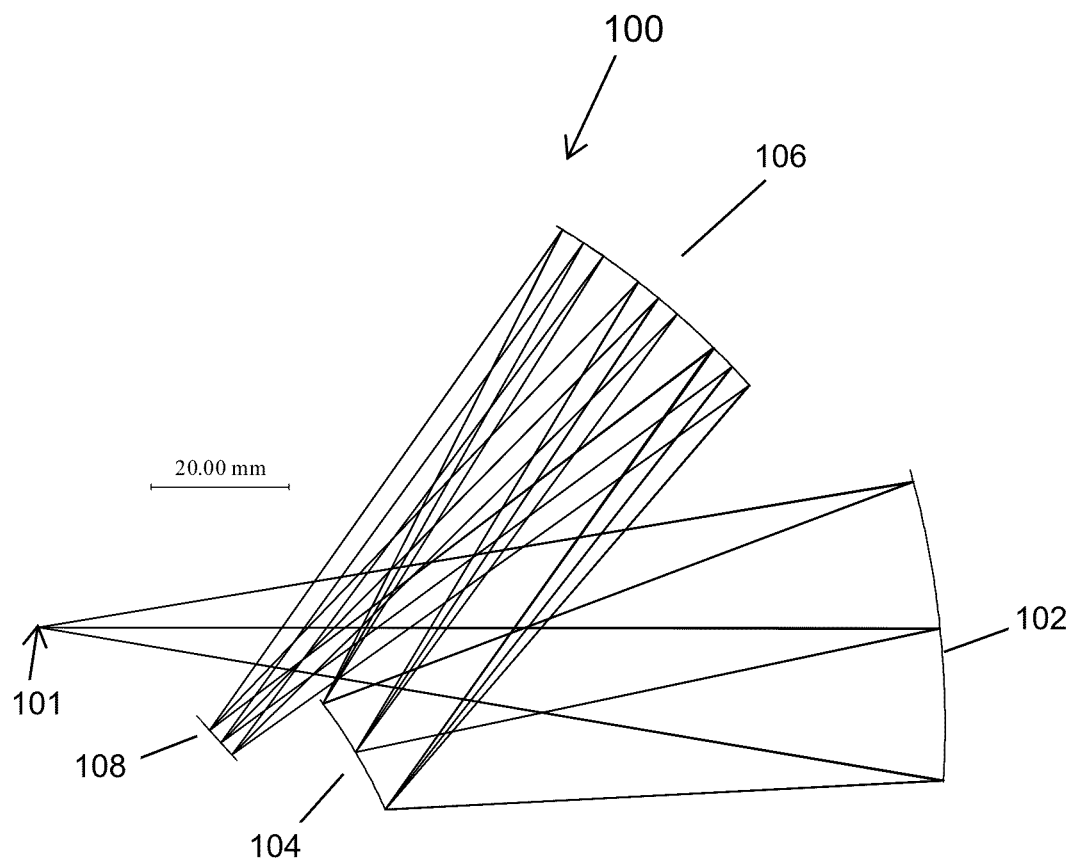
FIG. 1 is a front view of one embodiment of a freeform surface imaging spectrometer system.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "contact" is defined as a direct and physical contact. The term "substantially" is defined to be that while essentially conforming to the particular dimension, shape, or other feature that is described, the component is not or need not be exactly conforming to the description. The term "comprising," when utilized, means "including, but not necessarily limited to"; it specifically indicates open-ended inclusion or membership in the so-described combination, group, series, and the like.

Figure 2:
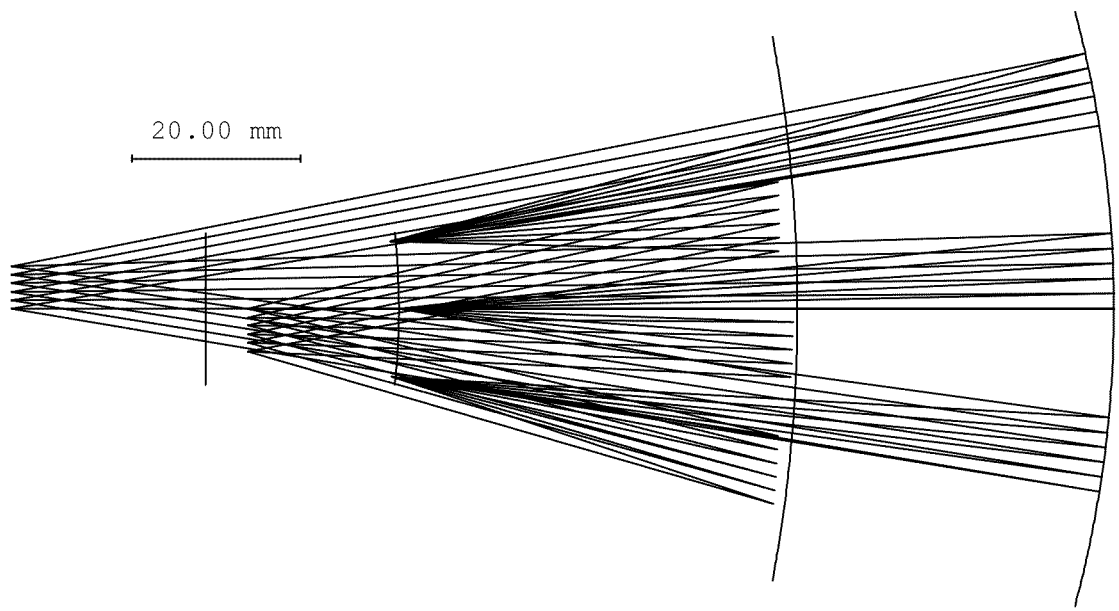
FIG. 2 is a top view of one embodiment of a freeform surface imaging spectrometer system.

FIGS. 1 and 2 illustrate one embodiment of a freeform surface imaging spectrometer system 100 comprises a primary mirror 102, a secondary mirror 104, a tertiary mirror 106, and a detector 108. The primary mirror 102, the secondary mirror 104, the tertiary mirror 106, and the detector 108 are spaced from each other. The feature rays exiting from a light source are successively reflected by the primary mirror 102, the secondary mirror 104 and the tertiary mirror 106 to form an image on the detector 108.

A surface shape of each of the primary mirror 102, the secondary mirror 104, and the tertiary mirror 106 is a freeform surface. The secondary mirror 104 is an aperture stop. The secondary mirror 104 is a grating having a freeform surface shape. The grating having the freeform surface shape is obtained by intersecting a set of equally spaced parallel planes with a freeform surface. A distance between adjacent parallel planes is defined as a grating pitch. The grating pitch can be ranged from about 0.004 millimeters to about 0.010 millimeters. In one embodiment, the grating pitch is about 0.007 millimeters.

A global three-dimensional rectangular coordinate system $(X_0, Y_0, Z_0)$ is defined by a location of a slit 101. An origin of the global three-dimensional rectangular coordinate system $(X_0, Y_0, Z_0)$ is an object point of a central field of view on the slit 101. A first three-dimensional rectangular coordinates system $(X,Y,Z)$ is defined by a location of the primary mirror 102; a second three-dimensional rectangular coordinates system $(X',Y',Z')$ is defined by a location of the secondary mirror 104; and a third three-dimensional rectangular coordinates system $(X'',Y'',Z'')$ is defined by a location of the tertiary mirror 106.

In the global three-dimensional rectangular coordinate system $(X_0, Y_0, Z_0)$, a line passing through the origin of the global three-dimensional rectangular coordinate system $(X_0, Y_0, Z_0)$ and coinciding with a length direction of the slit 101 is defined as an X-axis. The X-axis is perpendicular to a plane shown in FIG. 1, the inside of the X-axis is positive, and the outside is negative. A Y-axis is vertical in the plane shown in FIG. 1; the upward of the Y-axis is positive, and the downward is negative. A Z-axis is horizontal in the plane shown in FIG. 1, the left of the Z-axis is negative, and the right is positive.

A vertex of the primary mirror 102 is a first origin of the first three-dimensional rectangular coordinates system (X,Y, Z). The first three-dimensional rectangular coordinates system (X, Y, Z) is obtained by moving the global three-dimensional rectangular coordinate system ($X_0$, $Y_0$, $Z_0$) along a Z-axis in positive direction and a Y-axis in positive direction. In one embodiment, the first three-dimensional rectangular coordinates system (X, Y, Z) is obtained by moving the global three-dimensional rectangular coordinate system ($X_0$, $Y_0$, $Z_0$) for about 0.375 mm along the Y-axis in positive direction, and then moving for about 130.943 mm along the Z-axis in positive direction, and then rotating in a counterclockwise direction for about 5.188 degrees with the X axis being a rotation axis. A distance between the first origin of the first three-dimensional rectangular coordinates system (X, Y, Z) and the origin of the global three-dimensional rectangular coordinate system ($X_0$, $Y_0$, $Z_0$) is about 130.997 mm.

A reflective surface of the primary mirror 102 in the first three-dimensional rectangular coordinates system (X, Y, Z) is an xy polynomial freeform surface; and an xy polynomial equation can be expressed as follows:

$$z(x, y) = \frac{c(x^2 + y^2)}{1 + \sqrt{1 - (1 + k)c^2(x^2 + y^2)}} + \sum_{i=1}^{N} A_i x^m y^n.$$

In the xy polynomial equation, z represents surface sag, c represents surface curvature, k represents conic constant, while $A_i$ represents the ith term coefficient. Since the freeform surface imaging spectrometer system 100 is symmetrical about YZ plane, even order terms of x can be only remained. At the same time, higher order terms will increase the fabrication difficulty of the freeform surface imaging spectrometer system 100. In one embodiment, the reflective surface of the primary mirror 102 is an sixth-order polynomial freeform surface of xy without odd items of x; and an equation of the sixth-order polynomial freeform surface of xy can be expressed as follows:

$$z(x, y) = \frac{c(x^2 + y^2)}{1 + \sqrt{1 - (1 + k)c^2(x^2 + y^2)}} + A_2 y + A_3 x^2 +$$
$$A_5 y^2 + A_7 x^2 y + A_9 y^3 + A_{10} x^4 + A_{12} x^2 y^2 + A_{14} y^4 + A_{16} x^4 y +$$
$$A_{18} x^2 y^3 + A_{20} y^5 + A_{21} x^6 + A_{23} x^4 y^2 + A_{25} x^2 y^4 + A_{27} y^6.$$

In one embodiment, the values of c, k, and $A_i$ in the equation of the sixth-order polynomial freeform surface of xy of the reflective surface of the primary mirror 102 are listed in TABLE 1. However, the values of c, k, and $A_i$ in the sixth order xy polynomial equation are not limited to those appear in Table 1.

TABLE 1

| c | 1/−145.418275620109 |
|---|---|
| k | 0.624958846203866 |

TABLE 1-continued

| $A_2$ | −0.0163788177487878 |
|---|---|
| $A_3$ | −0.000295233410827397 |
| $A_5$ | −0.000210300869303387 |
| $A_7$ | 4.66485198772164e−006 |
| $A_9$ | −4.21385063387942e−007 |
| $A_{10}$ | 1.36627658326689e−008 |
| $A_{12}$ | −3.02182908797448e−009 |
| $A_{14}$ | 1.3081464012072e−008 |
| $A_{16}$ | 1.97565367144866e−010 |
| $A_{18}$ | 3.16770638046019e−010 |
| $A_{20}$ | −3.79206991893053e−011 |
| $A_{21}$ | 1.17652940989923e−012 |
| $A_{23}$ | 1.44167031123941e−012 |
| $A_{25}$ | 4.98199759406961e−013 |
| $A_{27}$ | 7.80274289683532e−013 |

A vertex of the secondary mirror 104 is a second origin of the second three-dimensional rectangular coordinates system (X', Y', Z'). The second three-dimensional rectangular coordinates system (X', Y', Z') is obtained by moving the global three-dimensional rectangular coordinate system ($X_0$, $Y_0$, $Z_0$) along a Z-axis in positive direction and a Y-axis in negative direction. In one embodiment, the second three-dimensional rectangular coordinates system (X', Y', Z') is obtained by moving the global three-dimensional rectangular coordinate system ($X_0$, $Y_0$, $Z_0$) for about 18.001 mm along the Y-axis in negative direction, and then moving for about 46.046 mm along Z-axis in positive direction, and then rotating in a counterclockwise direction for about 43.336 degrees with the X axis being the rotation axis. A distance between the second origin of the second three-dimensional rectangular coordinates system (X', Y', Z') and the origin of the global three-dimensional rectangular coordinate system ($X_0$, $Y_0$, $Z_0$) is about 49.442 mm.

A reflective surface of the secondary mirror 104 in the second three-dimensional rectangular coordinates system (X', Y', Z') is an x'y' polynomial freeform surface; and an x'y' polynomial equation can be expressed as follows:

$$z'(x', y') = \frac{c'(x'^2 + y'^2)}{1 + \sqrt{1 - (1 + k')c'^2(x'^2 + y'^2)}} + \sum_{i=1}^{N} A'_i x'^m y'^n.$$

In the x'y' polynomial equation, z' represents surface sag, c' represents surface curvature, k' represents conic constant, while $A_i'$ represents the ith term coefficient. Since the freeform surface imaging spectrometer system 100 is symmetrical about a Y'Z' plane, so even order terms of x' can be only remained. At the same time, higher order terms will increase the fabrication difficulty of the freeform surface imaging spectrometer system 100. In one embodiment, the reflective surface of the secondary mirror 104 is an sixth-order polynomial freeform surface of x'y' without odd items of x'; and an equation of the sixth-order polynomial freeform surface of x'y' can be expressed as follows:

$$z'(x', y') = \frac{c'(x'^2 + y'^2)}{1 + \sqrt{1 - (1 + k')c'^2(x'^2 + y'^2)}} + A'_2 y' + A'_3 x'^2 + A'_5 y'^2 +$$
$$A'_7 x'^2 y' + A'_9 y'^3 + A'_{10} x'^4 + A'_{12} x'^2 y'^2 + A'_{14} y'^4 + A'_{16} x'^4 y' +$$
$$A'_{18} x'^2 y'^3 + A'_{20} y'^5 + A'_{21} x'^6 + A'_{23} x'^4 y'^2 + A'_{25} x'^2 y'^4 + A'_{27} y'^6.$$

In one embodiment, the values of c', k', and $A_i'$ in the equation of the sixth-order polynomial freeform surface of x'y' of the reflective surface of the secondary mirror 104 are listed in TABLE 2. However, the values of c', k', and $A_i'$ in the sixth order x'y' polynomial equation are not limited to those listed in Table 2.

TABLE 2

| | |
|---|---|
| c' | 1/−74.787222409682 |
| k' | 0.197915885616308 |
| $A_2'$ | 0.219139600693203 |
| $A_3'$ | −0.0015668216458602 |
| $A_5'$ | −0.000113148729752593 |
| $A_7'$ | 0.000110773994138095 |
| $A_9'$ | 4.64610222017242e−006 |
| $A_{10}'$ | −1.41006542846292e−006 |
| $A_{12}'$ | −1.8434653293837e−006 |
| $A_{14}'$ | −1.53743088794955e−007 |
| $A_{16}'$ | 6.56200181475036e−008 |
| $A_{18}'$ | 3.31077127158278e−008 |
| $A_{20}'$ | −2.98732023163831e−009 |
| $A_{21}'$ | −8.1605169185165e−010 |
| $A_{23}'$ | −1.92331290018676e−009 |
| $A_{25}'$ | −6.01563974506452e−010 |
| $A_{27}'$ | −1.67959645045492e−010 |

A vertex of the tertiary mirror 106 is a third origin of the third three-dimensional rectangular coordinates system (X", Y", Z"). The third three-dimensional rectangular coordinates system (X", Y", Z") is obtained by moving the global three-dimensional rectangular coordinate system ($X_0$, $Y_0$, $Z_0$) along the Z-axis in positive direction and the Y-axis in positive direction. In one embodiment, the third three-dimensional rectangular coordinates system (X", Y", Z") is obtained by moving the global three-dimensional rectangular coordinate system ($X_0$, $Y_0$, $Z_0$) for about 93.370 mm along the Z-axis in positive direction, and then moving for about 44.689 mm along the Y-axis in positive direction, and then rotating in a counterclockwise direction for about 47.862 degrees with the X axis being the rotation axis. A distance between the third origin of the third three-dimensional rectangular coordinates system (X", Y", Z") and the origin of the global three-dimensional rectangular coordinate system ($X_0$, $Y_0$, $Z_0$) is about 103.513 mm.

A reflective surface of the tertiary mirror 106 in the third three-dimensional rectangular coordinates system (X",Y", Z") is an x"y" polynomial freeform surface; and an x"y" polynomial equation can be expressed as follows:

$$z''(x'', y'') = \frac{c''(x''^2 + y''^2)}{1 + \sqrt{1 - (1 + k'')c''^2(x''^2 + y''^2)}} + \sum_{i=1}^{N} A_i'' x''^m y''^n.$$

In the x"y" polynomial equation, z" represents surface sag, c" represents surface curvature, k" represents conic constant, while $A_i''$ represents the ith term coefficient. Since the freeform surface imaging spectrometer system 100 is symmetrical about a Y"Z" plane, even order terms of x" can be only remained. At the same time, higher order terms will increase the fabrication difficulty of the freeform surface imaging spectrometer system 100. In one embodiment, the reflective surface of the tertiary mirror 106 is an sixth-order polynomial freeform surface of x"y" without odd items of x"; and an equation of the sixth-order polynomial freeform surface of x"y" can be expressed as follows:

$$z''(x'', y'') = \frac{c''(x''^2 + y''^2)}{1 + \sqrt{1 - (1 + k'')c''^2(x''^2 + y''^2)}} + A_2'' y'' + A_3'' x''^2 + A_5'' y''^2 +$$

-continued
$$A_7'' x''^2 y'' + A_9'' y''^3 + A_{10}'' x''^4 + A_{12}'' x''^2 y''^2 + A_{14}'' y''^4 + A_{16}'' x''^4 y'' +$$
$$A_{18}'' x''^2 y''^3 + A_{20}'' y''^5 + A_{21}'' x''^6 + A_{23}'' x''^4 y''^2 + A_{25}'' x''^2 y''^4 + A_{27}'' y''^6.$$

In one embodiment, the values of c", k", and $A_i''$ in the equation of the sixth-order polynomial freeform surface of x"y" of the reflective surface of the tertiary mirror 106 are listed in TABLE 3. However, the values of c", k", and $A_i''$ in the sixth order x"y" polynomial equation are not limited to those listed in Table 3.

TABLE 3

| | |
|---|---|
| c" | 1/−125.336259302399 |
| k" | 0.730866579643393 |
| $A_2''$ | −0.013535502861499 |
| $A_3''$ | −0.000248904316215348 |
| $A_5''$ | −7.0630777168571e−005 |
| $A_7''$ | −1.67104431028359e−006 |
| $A_9''$ | −2.59911394183642e−006 |
| $A_{10}''$ | 1.53893531673435e−008 |
| $A_{12}''$ | 5.35895831746943e−008 |
| $A_{14}''$ | 3.52133563125681e−008 |
| $A_{16}''$ | −2.03909100495527e−010 |
| $A_{18}''$ | −3.41817171152247e−010 |
| $A_{20}''$ | −1.52203050072224e−010 |
| $A_{21}''$ | 1.84098557538911e−012 |
| $A_{23}''$ | 8.40400504710118e−012 |
| $A_{25}''$ | 7.32052575487887e−012 |
| $A_{27}''$ | 1.76461076891148e−012 |

The materials of the primary mirror 102, the secondary mirror 104 and the tertiary mirror 106 can be aluminum, beryllium or other metals. The materials of the primary mirror 102, the secondary mirror 104 and the tertiary mirror 106 can also be silicon carbide, quartz or other inorganic materials. A reflection enhancing coating can also be coated on the metals or inorganic materials to enhance the reflectivity performance of the three mirrors. In one embodiment, the reflection enhancing coating is a gold film. A size of each of the primary mirror 102, the secondary mirror 104 and the tertiary mirror 106 can be designed according to actual needs. In one embodiment, a size of the freeform surface imaging spectrometer system 100 is 132×85×62 mm.

In the global three-dimensional rectangular coordinate system ($X_0$, $Y_0$, $Z_0$), a distance along the Z-axis in negative direction between a center of the detector 108 and the vertex of the tertiary mirror 106 is about 391.895 mm. The center of the detector 108 deviates from the Z axis in the Y axis in positive direction, and the deviation is about 33.491 mm. An angle of the detector 108 with the XY plane in the clockwise direction is about 7.435 degrees. A size of the detector 108 can be selected according to actual needs. In one embodiment, the size of the detector 108 is 5 μm×5 μm.

A wavelength of the freeform surface imaging spectrometer system 100 is not limited, in one embodiment, the wavelength of the freeform surface imaging spectrometer system 100 is ranged from about 400 nm to about 1000 nm. A spectral resolution of the freeform surface imaging spectrometer system 100 is equal to or more than 2 nanometers.

An F-number of the freeform surface imaging spectrometer system 100 is less than or equal to 3.0. A relative aperture (D/f) is the reciprocal of the F-number. In one embodiment, the F-number is 3.0, and the relative aperture (D/f) is ⅓.

A numerical aperture of the freeform surface imaging spectrometer system 100 ranges from about 0.1 to about 0.2.

In one embodiment, the numerical aperture of the freeform surface imaging spectrometer system 100 is about 0.16.

A slit length of the freeform surface imaging spectrometer system 100 is ranged from about 8 millimeters to about 12 millimeters. A slit width of the freeform surface imaging spectrometer system 100 is ranged from 6 micrometers to about 10 micrometers. In one embodiment, the slit length of the freeform surface imaging spectrometer system 100 is about 10 millimeters, and the slit width of the freeform surface imaging spectrometer system 100 is about 8 micrometers.

A magnification of the freeform surface imaging spectrometer system 100 is 1:1.

A color distortion of the freeform surface imaging spectrometer system 100 is less than 20% pixel size. A spectral line bending of the freeform surface imaging spectrometer system 100 is less than 20% pixel size.

Figure 3:
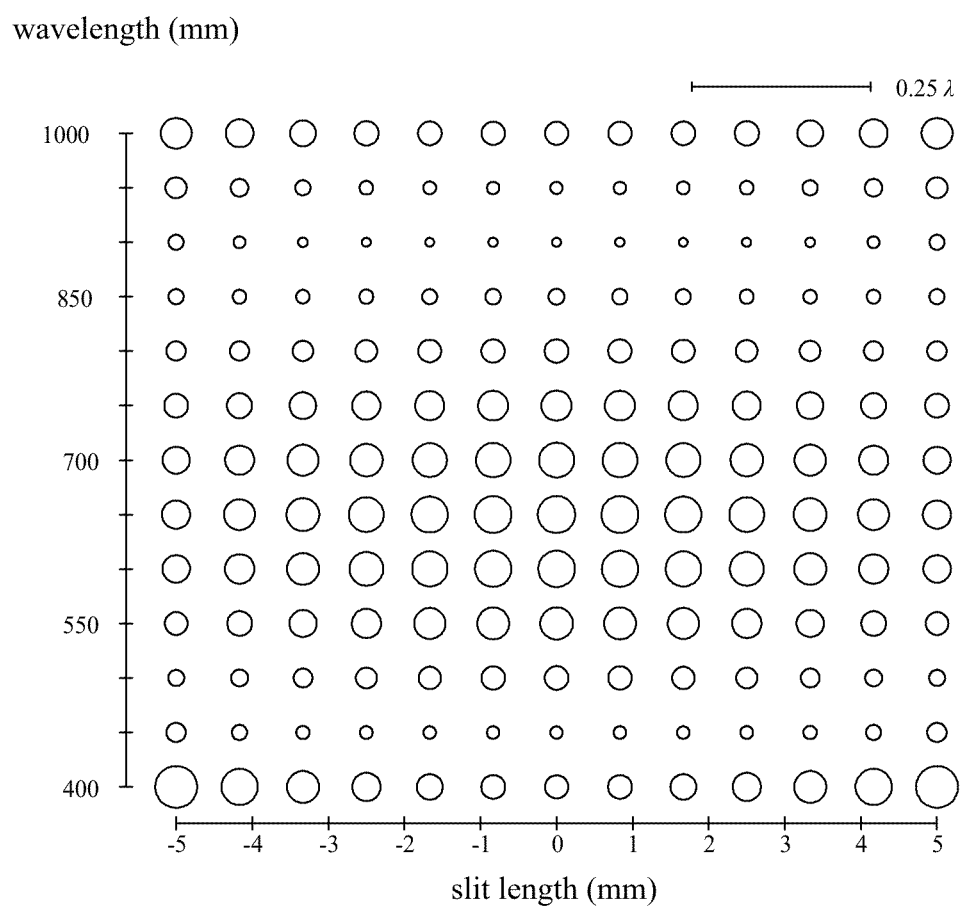
FIG. 3 is a wave aberration diagram of one embodiment of the freeform surface imaging spectrometer system in FIG. 1.

FIG. 3 shows a wave aberration of the freeform surface imaging spectrometer system 100. It can be seen that the freeform surface imaging spectrometer system 100 are close to the diffraction limit at each wavelength and each field of view. It shows that an imaging quality of the freeform surface imaging spectrometer system 100 is excellent.

The freeform surface imaging spectrometer system 100 using an off-axis three-mirror system, and a size structure of the off-axis three-mirror system is 132×85×62 mm, therefore, the structure of the freeform surface imaging spectrometer system 100 is compact. The F-number of the freeform surface imaging spectrometer system 100 is less than or equal to 3.0, high resolution images can be obtained by the freeform surface imaging spectrometer system 100. The freeform surface imaging spectrometer system 100 can achieve low distortion, long slits, wide spectral range and high spectral resolution while maintaining a compact structure, the freeform surface imaging spectrometer system 100 has an excellent overall performance.

The applications of the freeform surface imaging spectrometer system 100 comprises earth observation, space target detection, astronomical observations, Multi-spectral thermal imaging, and dimensional mapping. The freeform surface imaging spectrometer system 100 can be used in the visible band or the infrared band.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A freeform surface imaging spectrometer system comprising:

a primary mirror, wherein a global three-dimensional rectangular coordinate system ($X_0$, $Y_0$, $Z_0$) is established in a space wherein a slit of the freeform surface imaging spectrometer system is located, an origin of the global three-dimensional rectangular coordinate system ($X_0$, $Y_0$, $Z_0$) is an object point of a central field of view on the slit, and the global three-dimensional rectangular coordinate system ($X_0$, $Y_0$, $Z_0$) comprises an X-axis, a Y-axis, and a Z-axis; and a first three-dimensional rectangular coordinates system (X, Y, Z) is established, a first origin of the first three-dimensional rectangular coordinates system (X, Y, Z) is a vertex of the primary mirror, and the first three-dimensional rectangular coordinates system (X, Y, Z) is obtained by moving the global three-dimensional rectangular coordinate system ($X_0$, $Y_0$, $Z_0$) along a Z-axis positive direction of the Z-axis and a Y-axis positive direction of the Y-axis; and a reflective surface of the primary mirror in the first three-dimensional rectangular coordinates system (X, Y, Z) is an xy polynomial freeform surface;

a secondary mirror being as an aperture stop, wherein the secondary mirror is a grating a grating pitch of the grating is ranged from about 0.004 millimeters to about 0.010 millimeters; and a second three-dimensional rectangular coordinates system (X', Y', Z') is established, wherein a second origin of the second three-dimensional rectangular coordinates system (X', Y', Z') is a vertex of the secondary mirror, and the second three-dimensional rectangular coordinates system (X', Y', Z') is obtained by moving the global three-dimensional rectangular coordinate system ($X_0$, $Y_0$, $Z_0$) along the positive direction of the Z-axis and a negative direction of the Y-axis; and a reflective surface of the secondary mirror in the second three-dimensional rectangular coordinates system (X', Y', Z') is an x'y' polynomial freeform surface;

a tertiary mirror, wherein a third three-dimensional rectangular coordinates system (X", Y", Z") is established, and the third three-dimensional rectangular coordinates system (X", Y", Z") is obtained by moving the global three-dimensional rectangular coordinate system ($X_0$, $Y_0$, $Z_0$) along the positive direction of the Z-axis and the positive direction of the Y-axis; and a reflective surface of the tertiary mirror in the third three-dimensional rectangular coordinates system (X", Y", Z") is an x"y" polynomial freeform surface; and a detector, wherein a plurality of feature rays exiting from a light source is successively reflected by the primary mirror, the secondary mirror and the tertiary mirror and forms an image on the detector, wherein a spectral resolution of the freeform surface imaging spectrometer system is equal to or more than 2 nanometers.

2. The system as claimed in claim 1, wherein the xy polynomial freeform surface is an sixth-order polynomial freeform surface of xy without odd items of x; and an equation of the sixth-order polynomial freeform surface of xy is:

$$z(x, y) = \frac{c(x^2 + y^2)}{1 + \sqrt{1 - (1+k)c^2(x^2 + y^2)}} + A_2 y + A_3 x^2 + A_5 y^2 + A_7 x^2 y + A_9 y^3 + A_{10} x^4 + A_{12} x^2 y^2 + A_{14} y^4 + A_{16} x^4 y + A_{18} x^2 y^3 + A_{20} y^5 + A_{21} x^6 + A_{23} x^4 y^2 + A_{25} x^2 y^4 + A_{27} y^6,$$

wherein z represents surface sag, c represents surface curvature, k represents conic constant, while $A_i$ represents the ith term coefficient.

3. The system as claimed in claim 2, wherein c=1/−145.418275620109, k=0.624958846203866, $A_2$=−0.0163788177487878, $A_3$=−0.000295233410827397, $A_5$=−0.000210300869303387, $A_7$=4.66485198772164e-006, $A_9$=−4.21385063387942e-007, $A_{10}$=1.36627658326689e-008, $A_{12}$=−3.02182908797448e-009, $A_{14}$=1.3081464012072e-008, $A_{16}$=1.97565367144866e-010, $A_{18}$=3.16770638046019e-010, $A_{20}$=−3.79206991893053e-011, $A_{21}$=1.17652940989923e-012, $A_{23}$=1.44167031123941e-012, $A_{25}$=4.98199759406961e-013, and $A_{27}$=7.80274289683532e-013.

4. The system as claimed in claim 1, wherein the x'y' polynomial freeform surface is an sixth-order polynomial freeform surface of x'y' without odd items of x'; and an equation of the sixth-order polynomial freeform surface of x'y' is:

$$z'(x', y') = \frac{c'(x'^2 + y'^2)}{1 + \sqrt{1 - (1+k')c'^2(x'^2 + y'^2)}} + A_2'y' + A_3'x'^2 + A_5'y'^2 +$$
$$A_7'x'^2y' + A_9'y'^3 + A_{10}'x'^4 + A_{12}'x'^2y'^2 + A_{14}'y'^4 + A_{16}'x'^4y' +$$
$$A_{18}'x'^2y'^3 + A_{20}'y'^5 + A_{21}'x'^6 + A_{23}'x'^4y'^2 + A_{25}'x'^2y'^4 + A_{27}'y'^6,$$

wherein z' represents surface sag, c' represents surface curvature, k' represents conic constant, while $A_i'$ represents the ith term coefficient.

5. The system as claimed in claim 4, wherein c'=1/−74.787222409682, k'=0.197915885616308, $A_2'$=0.219139600693203, $A_3'$=−0.0015668216458602, $A_5'$=−0.000113148729752593, $A_7'$=0.000110773994138095, $A_9'$=4.64610222017242e-006, $A_{10}'$=−1.41006542846292e-006, $A_{12}'$=−1.8434653293837e-006, $A_{14}'$=−1.53743088794955e-007, $A_{16}'$=6.56200181475036e-008, $A_{18}'$=3.31077127158278e-008, $A_{20}'$=−2.98732023163831e-009, $A_{21}'$=−8.1605169185165e-010, $A_{23}'$=−1.92331290018676e-009, $A_{25}'$=−6.01563974506452e-010, and $A_{27}'$=−1.67959645045492e-010.

6. The system as claimed in claim 1, wherein the x"y" polynomial freeform surface is an sixth-order polynomial freeform surface of x"y" without odd items of x"; and an equation of the sixth-order polynomial freeform surface of x"y" is:

$$z''(x'', y'') = \frac{c''(x''^2 + y''^2)}{1 + \sqrt{1 - (1+k'')c''^2(x''^2 + y''^2)}} + A_2''y'' + A_3''x''^2 + A_5''y''^2 +$$
$$A_7''x''^2y'' + A_9''y''^3 + A_{10}''x''^4 + A_{12}''x''^2y''^2 + A_{14}''y''^4 + A_{16}''x''^4y'' +$$
$$A_{18}''x''^2y''^3 + A_{20}''y''^5 + A_{21}''x''^6 + A_{23}''x''^4y''^2 + A_{25}''x''^2y''^4 + A_{27}''y''^6,$$

wherein z" represents surface sag, c" represents surface curvature, k" represents conic constant, while $A_i''$ represents the ith term coefficient.

7. The system as claimed in claim 6, wherein c"=1/−125.336259302399, k"=0.730866579643393, $A_2''$=−0.013535502861499, $A_3''$=−0.000248904316215348, $A_5''$=−7.06307771685 71e-005, $A_7''$=−1.67104431028359e-006, $A_9''$=−2.59911394183642e-006, $A_{10}''$=1.53893531673435e-008, $A_{12}''$=5.35895831746943e-008, $A_{14}''$=−2.03909100495527e-010, $A_{16}''$=3.52133563125681e-008, $A_{18}''$=−3.41817171152247e-010, $A_{20}''$=−1.52203050072224e-010, $A_{21}''$=1.84098557538911e-012, $A_{23}''$=8.40400504710118e-012, $A_{25}''$=7.32052575487887e-012, and $A_{27}''$=1.76461076891148e-012.

8. The system as claimed in claim 1, wherein an F-number of the freeform surface imaging spectrometer system is less than or equal to 3.0.

9. The system as claimed in claim 1, wherein a numerical aperture of the freeform surface imaging spectrometer system ranges from about 0.1 to about 0.2.

10. The system as claimed in claim 1, wherein a slit length of the freeform surface imaging spectrometer system is ranged from about 8 millimeters to about 12 millimeters.

11. The system as claimed in claim 1, wherein a slit width of the freeform surface imaging spectrometer system ranges from about 6 micrometers to about 10 micrometers.

12. The system as claimed in claim 1, wherein the first three-dimensional rectangular coordinates system (X, Y, Z) is obtained by moving the global three-dimensional rectangular coordinate system ($X_0$, $Y_0$, $Z_0$) for about 0.375 mm along the Y-axis in positive direction, and then moving for about 130.943 mm along the Z-axis in positive direction, and then rotating in a counterclockwise direction for about 5.188 degrees with the X axis being a rotation axis.

13. The system as claimed in claim 1, wherein the second three-dimensional rectangular coordinates system (X', Y', Z') is obtained by moving the global three-dimensional rectangular coordinate system ($X_0$, $Y_0$, $Z_0$) for about 18.001 mm along the Y-axis in negative direction, and then moving for about 46.046 mm along the Z-axis in positive direction, and then rotating in a counterclockwise direction for about 43.336 degrees with the X axis being a rotation axis.

14. The system as claimed in claim 1, wherein the third three-dimensional rectangular coordinates system (X", Y", Z") is obtained by moving the global three-dimensional rectangular coordinate system ($X_0$, $Y_0$, $Z_0$) for about 93.370 mm along the Z-axis in positive direction, and then moving for about 44.689 mm along the Y-axis in positive direction, and then rotating in a counterclockwise direction for about 47.862 degrees with the X axis being the rotation axis.

15. The system as claimed in claim 1, wherein a distance between the first origin and the origin of the global three-dimensional rectangular coordinate system ($X_0$, $Y_0$, $Z_0$) is about 130.997 mm.

16. The system as claimed in claim 1, wherein a distance between the second origin and the origin of the global three-dimensional rectangular coordinate system ($X_0$, $Y_0$, $Z_0$) is about 49.442 mm.

* * * * *